United States Patent
Chigira

(12) United States Patent     (10) Patent No.: US 6,970,723 B2
       Chigira                                             (45) Date of Patent:      Nov. 29, 2005

(54) MOBILE-TYPE ELECTRONIC APPARATUS AND METHOD FOR CONTROLLING THE SAME

(75) Inventor: Tatsuo Chigira, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 666 days.

(21) Appl. No.: 09/816,051

(22) Filed: Mar. 23, 2001

(65) Prior Publication Data

US 2001/0036847 A1     Nov. 1, 2001

(30) Foreign Application Priority Data

Mar. 27, 2000     (JP)   ............................. 2000-086189

(51) Int. Cl.[7] .............................................. H04B 1/38
(52) U.S. Cl. .................. 455/566; 455/575.1; 455/574; 348/14.02; 345/7
(58) Field of Search ............................. 455/566, 574, 455/572.2, 557, 569.1, 575.2, 575.1; 348/14.02, 348/14.04, 14.07; 345/7, 8, 9

(56) References Cited

U.S. PATENT DOCUMENTS

| | | | |
|---|---|---|---|
| 5,048,077 A | * | 9/1991 | Wells et al. ............. 379/93.17 |
| 5,491,507 A | * | 2/1996 | Umezawa et al. ........ 348/14.02 |
| 6,073,033 A | * | 6/2000 | Campo ........................ 455/566 |
| 6,073,034 A | * | 6/2000 | Jacobsen et al. ............ 455/566 |
| 6,085,112 A | * | 7/2000 | Kleinschmidt et al. .. 455/556.1 |
| 6,137,525 A | * | 10/2000 | Lee et al. ................. 348/14.02 |
| 6,141,568 A | * | 10/2000 | Sakaguchi ................... 455/566 |
| 6,515,638 B2 | * | 2/2003 | Chigira et al. .................. 345/7 |
| 2001/0054988 A1 | * | 12/2001 | Cone et al. ...................... 345/7 |

* cited by examiner

*Primary Examiner*—Edward F. Urban
*Assistant Examiner*—Blane J. Jackson
(74) *Attorney, Agent, or Firm*—Cowan, Liebowitz & Latman, P.C.

(57) ABSTRACT

A mobile-type electronic apparatus is arranged to input an image picked up by a camera to a display circuit through an image pickup circuit and a communication circuit and to display the image on an LCD panel in a state of being enlarged by an enlargement display optical system. In the mobile-type electronic apparatus, a control circuit is arranged to switch the power supply for the display circuit from one state over to another, according to an operation performed on a switch portion, in such a way as to supply electric power only when the use of the LCD panel and a back light is necessary.

8 Claims, 4 Drawing Sheets

MOBILE-TYPE ELECTRONIC APPARATUS AND METHOD FOR CONTROLLING THE SAME

BACKGROUND OF THE INVENTION

1. Field of the Invention

The present invention relates to an electronic apparatus which is movable easily and quickly, and, more particularly, to a mobile-type electronic apparatus arranged to receive image signals and to display images, and to a control method for controlling the mobile-type electronic apparatus.

2. Description of Related Art

As a result of the recent increase in communication speed, a video conference system is being developed for practical applications. Meanwhile, a mobile-type electronic apparatus, such as a notebook-type personal computer, is being arranged to use a video camera as an accessory thereof.

It is important for such a mobile-type electronic apparatus to arrange a small display to be viewable at a large angle of view with a high picture quality. One of proposals for attaining this purpose has been disclosed in Japanese Laid-Open Patent Application No. Hei 10-191288.

The art disclosed in Japanese Laid-Open Patent Application No. Hei 10-191288 is the arrangement for displaying a virtual image by enlarging a small liquid crystal panel to a predetermined angle of view. In viewing a picture plane of VGA (640×480 dots) on a direct-viewing-type liquid crystal panel, for example, since the resolution of the eye of man is one minute of angle, in order to enable a viewer who is a little presbyopic to see at a distance of 30 cm, the liquid crystal panel must be of a size diagonally measuring "2×5/4×30×tan(1/60×640)" cm, i.e., 14.1 cm, with the aspect ratio of the picture plane assumed to be 4:3. According to the art disclosed in Japanese Laid-Open Patent Application No. Hei 10-191288, on the other hand, an image of high picture quality can be displayed by means of a compact display by enlarging a small liquid crystal panel diagonally measuring 0.5 inch (1.27 cm) to a horizontal angle of view of 21.3 degrees.

Mobile-type electronic apparatuses, such as notebook-type personal computers, are arranged in general to use a rechargeable battery as a power source. However, in order to enhance the portability of the apparatus, the body of the apparatus must be reduced in weight and, therefore, must be arranged to save electric energy for use of a battery of small capacity over a long period of time.

An electronic apparatus disclosed, for example, in Japanese Laid-Open Patent Application No. Hei 9-322137 is arranged for this purpose. The electronic apparatus disclosed in Japanese Laid-Open Patent Application No. Hei 9-322137 is arranged to suppress electric energy consumption by cutting off a power supply for an image pickup system including a CCD of a TV (video) camera when the electronic apparatus is not used.

However, in a mobile-type electronic apparatus as mentioned above, an image display function is important as well as an image signal transmitting function. In view of these functions, it is desired to have the apparatus arranged to be small in size, to be light in weight, to be movable easily and quickly and to be usable over a long period time with the battery charged once.

The electronic apparatus disclosed in Japanese Laid-Open Patent Application No. Hei 10-191288 is capable of displaying a high quality image at a large angle of view and also lessening electric energy consumption for illuminating the liquid crystal panel, as compared with a direct-viewing-type liquid crystal panel of a relatively large size. The electronic apparatus, however, has a problem in the following point. If the liquid crystal display panel is arranged to use many pixels such as 180 thousand or 270 thousand pixels or pixels of SVGA for obtaining a high picture quality, a number of times of arithmetic operation to be performed by a control circuit according to image signals coming from such many pixels increases. As a result, electric energy consumption also increases.

The electronic apparatus disclosed in Japanese Laid-Open Patent Application No. Hei 9-322137 is arranged to save electric energy on the side of the TV (video) camera to be used in photo-taking. However, the electronic apparatus is not arranged to suppress electric energy consumption for display. The electronic apparatus thus has a problem in respect of the electric energy consumption on the side of display.

In the case of a mobile-type electronic apparatus, such as a notebook-type personal computer, the use of the electronic apparatus for photo-taking (picking up images) is a special function, as compared with the use of the electronic apparatus for ordinary information display and data processing. The length of time of use of the electronic apparatus for the photo-taking function is expected to be shorter than the use of the electronic apparatus for other functions. The electronic apparatus thus has a problem with respect to the arrangement for increasing its serviceable time obtainable by charging the battery once.

BRIEF SUMMARY OF THE INVENTION

The invention is directed to the solution of the above-stated problems. It is, therefore, an object of the invention to provide a mobile-type electronic apparatus arranged to lessen electric energy consumption and to increase the length of serviceable time obtainable by charging a battery once, and also to provide a method for controlling the mobile-type electronic apparatus.

To attain the above object, in accordance with an aspect of the invention, there is provided a mobile-type electronic apparatus, comprising communication means capable of transmitting and receiving image data, a display element arranged to display image data, enlargement display means arranged to optically enlarge an image on the display element and to display the enlarged image as a virtual image, a display circuit arranged to cause the display element to display image data, operation means for controlling the display circuit, and control means for controlling a power supply for the display circuit in accordance with an operation on the operation means.

In accordance with another aspect of the invention, there is provided a mobile-type electronic apparatus, comprising communication means capable of transmitting and receiving image data, a display element arranged to display image data, enlargement display means arranged to optically enlarge an image on the display element and to display the enlarged image as a virtual image, a display circuit arranged to cause the display element to display image data, detecting means for detecting that a body of the electronic apparatus has been grasped by hand, and control means for turning on a power supply for a part of or the whole of the display circuit when the detecting means has detected that the body of the electronic apparatus has been grasped by hand.

In accordance with a further aspect of the invention, there is provided a mobile-type electronic apparatus, comprising communication means capable of transmitting and receiving image data, a display element arranged to display information necessary for a communicating operation, enlargement display means arranged to optically enlarge an image on the display element and to display the enlarged image as a virtual image, a display circuit arranged to cause the display element to display image data, discriminating means for discriminating a communicating state of the communication means, and control means for controlling a power supply for the display circuit in accordance with an output of the discriminating means.

In accordance with a still further aspect of the invention, there is provided a mobile-type electronic apparatus, comprising communication means capable of transmitting and receiving image data, a display element arranged to display image data or information necessary for a communicating operation, enlargement display means arranged to optically enlarge an image on the display element and to display the enlarged image as a virtual image, a display circuit arranged to cause the display element to display image data, detecting means for detecting that the enlargement display means has been peeped at, and control means for controlling a power supply for the display circuit in accordance with an output of the detecting means.

The above and further objects and features of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.

(First Embodiment)

A mobile-type electronic apparatus according to a first embodiment of the invention is described with reference to FIG. 1.

Figure 1:
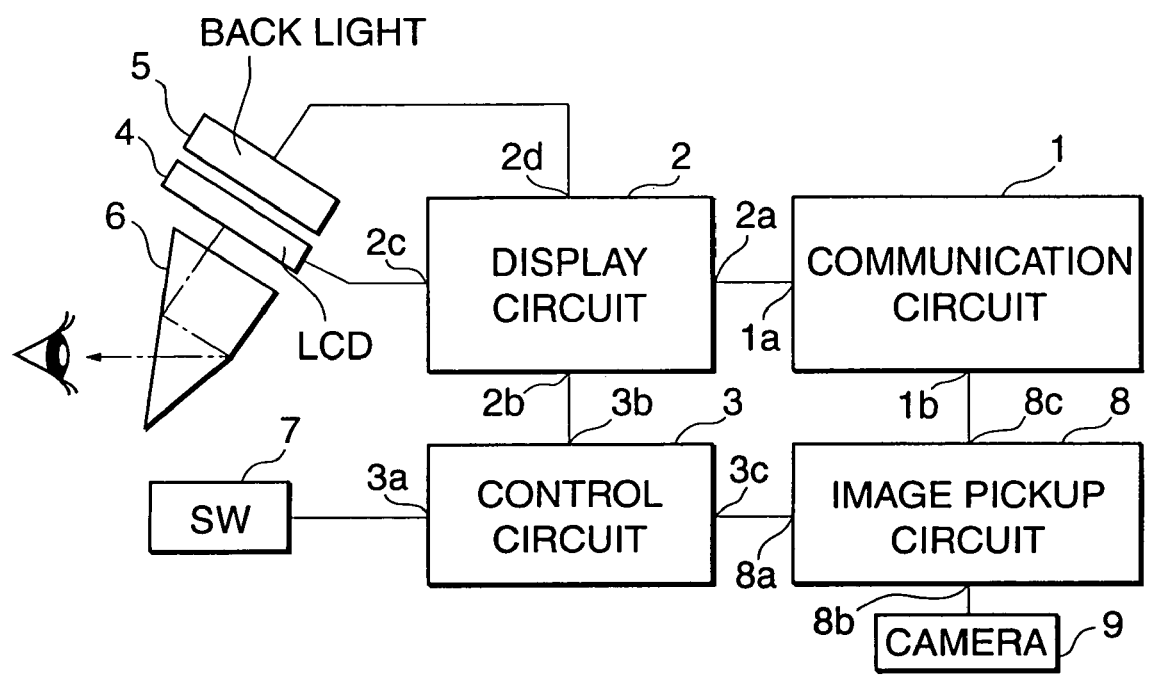
FIG. 1 is a block diagram showing the arrangement of a mobile-type electronic apparatus according to a first embodiment of the invention.

FIG. 1 is a block diagram showing the arrangement of essential parts of the mobile-type electronic apparatus according to the first embodiment. Referring to FIG. 1, the mobile-type electronic apparatus includes a communication circuit 1 (communication means), a display circuit 2, a control circuit 3 (control means), an LCD (liquid crystal) panel 4 (display element), a back light 5, an enlargement display means 6 which is composed of a prism or the like to optically enlarge an image displayed on the LCD panel 4 and to display the enlarged image, a switch means 7, an image pickup circuit 8, and a camera using an image sensor, such as a CCD or the like.

The communication circuit 1 is arranged to be capable of transmitting and receiving image data as well as data signals of varied kinds to be processed by the electronic apparatus. The communication circuit 1 is arranged to be connected to a communication channel. With the communication circuit 1 connected to the communication channel, the communication circuit 1 can transmit images picked up by the camera 9 and audio data etc., taken in through a microphone (not shown) and also can receive image data, audio data, etc.

The communication circuit 1 is provided with a first input terminal group 1b, a second input terminal group (not shown), a first output terminal group 1a and a second output terminal group (not shown).

The first input terminal group 1b of the communication circuit 1 is connected to an output terminal group 8c of the image pickup circuit 8. The second input terminal group of the communication circuit 1 is connected to the microphone (not shown). Further, the first output terminal group 1a of the communication circuit 1 is connected to a first input terminal group 2a of the display circuit 2. The second output terminal group of the communication circuit 1 is connected to a speaker (not shown). The communication circuit 1 is further connected to a key switch of an operation part (not shown) and is thus arranged to be operable by a key input operation.

The display circuit 2 performs a decoding function and also functions as a timing generator in a known manner. An image or character information obtained through the image signal received by the communication circuit 1 is caused by the display circuit 2 to be displayed on the LCD panel 4, which is a display element.

The first input terminal group 2a of the display circuit 2 is connected to the first output terminal group 1a of the communication circuit 1 to receive image signals from the communication circuit 1. A first output terminal group 2c and a second output terminal group 2d of the display circuit 2 are connected respectively to the LCD panel 4 and the back light 5.

The display circuit 2 forms a signal conforming to the pixel array of the LCD panel 4 on the basis of a signal input from the communication circuit 1 to the first input terminal group 2a and sends the formed signal to the LCD panel 4 to form an image on the LCD panel 4. The display circuit 2 also causes the back light 5 to light up.

The second input terminal group 2b is provided on the display circuit 2 for control over the power supply for the display circuit 2, the LCD panel 4 and the back light 5. The power supply for the display circuit 2, the LCD panel 4 and the back light 5 is turned on, for example, when the second input terminal group 2b is at a predetermined voltage, i.e., at a high (H) level, and the power supply for the display circuit 2, the LCD panel 4 and the back light 5 is turned off when the second input terminal group 2b is at another predetermined voltage, i.e., at a low (L) level.

The LCD panel 4 is a display panel using, for example, a known TFT liquid crystal element and is connected to the first output terminal group 2c of the display circuit 2. The LCD panel 4 is thus arranged to form an image based on a signal received from the display circuit 2.

The back light 5 is a surface-light-emitting light source, which is composed of, for example, an LED and a light guiding plate. The input terminal group of the back light 5 is connected to the second output terminal group 2d of the display circuit 2. The back light 5 is thus arranged to light up in accordance with the state of the second output terminal group 2d of the display circuit 2.

The enlargement display means 6 is in the form of a free curved prism obtained, for example, by molding a transparent plastic material. The enlargement display means 6 and the LCD panel 4 are fixed at their relative positions where the image on the LCD panel 4 has a predetermined diopter and where the angle of view shows each pixel of the LCD panel 4 at least at an angle of about one minute. The image on the LCD panel 4 is thus displayed in an enlarged state as a virtual image. A prism optical system disclosed in Japanese Laid-Open Patent Application No. Hei 7-333551, for example, may be employed as the free curved prism.

The switch means 7 represents an operation means. The switch means 7, which is, for example, of a push type, has a terminal group thereof connected to a first input terminal group 3a of the control circuit 3.

The control circuit 3 is provided with the first input terminal group 3a and first and second output terminal groups 3b and 3c. The first and second output terminal groups 3b and 3c are arranged to be in their predetermined states according to the state of the first input terminal group 3a.

For example, the control circuit 3 is arranged to set the first and second output terminal groups 3b and 3c at low (L) level states when the first input terminal group 3a is in an open state, and to set the first and second output terminal groups 3b and 3c at high (H) level states when the first input terminal group 3a is in a closed state.

The first output terminal group 3b of the control circuit 3 is connected to the second input terminal group 2b of the display circuit 2. The control circuit 3 is thus arranged to change the state of the power supply for the display circuit 2, the LCD panel 4 and the back light 5 from one state over to another according to the state of the switch means 7.

More specifically, the state of the first output terminal group 3b of the control circuit 3 takes the high (H) level state when the input terminal group 3a is in the closed state with the switch means 7 operated. The high level state of the first output terminal group 3b of the control circuit 3 causes the display circuit 2 to form an image on the LCD panel 4 according to an input signal coming from the first input terminal group 2a and also to light up the back light 5.

When the first input terminal group 3a of the control circuit 3 is in the open state with the switch means 7 not operated, the first output terminal group 3b of the control circuit 3 takes the low (L) level state to cause the display circuit 2 to turn off its power supply and the power supply for the LCD panel 4 and also to put out the back light 5.

The image pickup circuit 8 is arranged to compose and encode image signals obtained by the camera 9 into transmissible signals. The camera 9 is a known CCD camera. The image pickup circuit 8 is provided with first and second input terminal groups 8a and 8b and a first output terminal group 8c.

The second input terminal group 8b of the image pickup circuit 8 is connected to the output terminal group of the camera 9. The first output terminal group 8c of the image pickup circuit 8 is connected to the first input terminal group 1b of the communication circuit 1. With an image signal obtained by the camera 9 inputted to the image pickup circuit 8, the image pickup circuit 8 converts the image signal into a transmissible signal and sends the transmissible signal out to the communication circuit 1. The first input terminal group 8a of the image pickup circuit 8 is provided for control over the power supply for the image pickup circuit 8 and the camera 9. For example, the power supply for the image pickup circuit 8 and the camera 9 is turned on when the first input terminal group 8a of the image pickup circuit 8 is at a predetermined voltage, i.e., at a high (H) level, and the power supply for the image pickup circuit 8 and the camera 9 is turned off when the first input terminal group 8a of the image pickup circuit 8 is at a voltage of 0V, i.e., at a low level.

The first input terminal group 8a of the image pickup circuit 8 is connected to the second output terminal group 3c of the control circuit 3. Therefore, when the input terminal group 3a of the control circuit 3 is in the closed state with the switch means 7 operated, the level of the second output terminal group 3c of the control circuit 3 becomes high (H) to cause the image pickup circuit 8 to turn on the power supply for the camera 9. Then, an image signal obtained by the camera 9 is inputted to the image pickup circuit 8 to be sent out to the communication circuit 1 in the form of a transmissible signal. Further, when the input terminal group 3a is in the open state with the switch means 7 not operated, the level of the second output terminal group 3c of the control circuit 3 becomes low (L) to cause the image pickup circuit 8 to turn off its power supply and also the power supply for the camera 9.

As described above, the mobile-type electronic apparatus according to the first embodiment of the invention is arranged to consume the electric energy of the power supply for the image display system only when the switch means 7 is operated by the user of the apparatus. While the apparatus is in a normal state, the power supply for a part of or whole of the display circuit 2 is kept in an off-state, so that electric energy can be much saved while the apparatus is used for normal talking by voices only or while the apparatus is in a standby state.

The switch means 7 is arranged to be a push-type switch. The use of the push-type switch has an advantage in that the push-type switch clearly reflects what is intended by the user in respect of the image display operation and the image pickup operation, so that electric energy can be effectively saved. However, the use of the push-type switch is not always advantageous in terms of operability.

In a case where importance is set on operability, the known touch sensor of a pressure sensitive type or a capacity detecting type may be used as the switch means 7. In such a case, a known detecting circuit which corresponds to the above touch sensor is arranged within the control circuit 3. Such an arrangement relieves the user from the troublesomeness of a switch operation and also saves electric energy during a standby period.

In the case of the first embodiment, the power supply for the image pickup system is arranged to be cut off also by operating the switch means 7. However, the arrangement may be changed to arrange the image pickup system separately from the display system. Such a modification effectively saves consumption of the electric energy by the image pickup system in a case, for example, where the mobile-type electronic apparatus is connected to the Internet to see a home page.

(Second Embodiment)

The first embodiment is arranged to detect that the switch means 7 provided on the mobile-type electronic apparatus has been operated or that the mobile-type electronic apparatus has been grasped by the hand of the user. However, a second embodiment of the invention is arranged to detect that the user has peeped at a display part. This arrangement of the second embodiment ensures electric energy saving without any troublesome operation.

An example of the arrangement for controlling a power supply for a display system by detecting that the user has peeped at the display part is next described below with reference to FIGS. 2 and 3, which show a mobile-type electronic apparatus according to the second embodiment.

Figure 2:
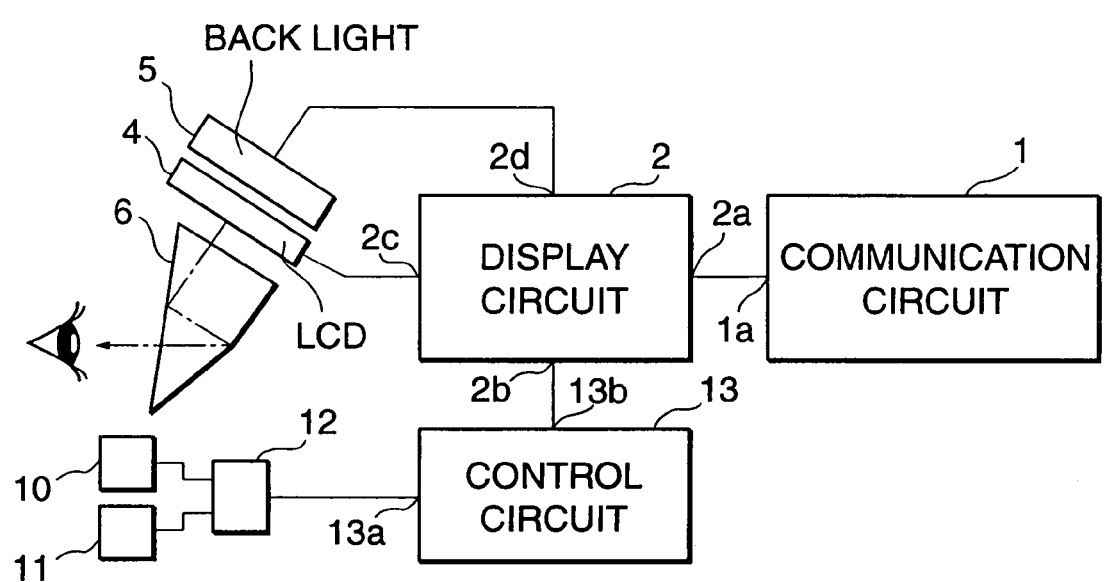
FIG. 2 is a block diagram showing the arrangement of a mobile-type electronic apparatus according to a second embodiment of the invention.
Figure 3:
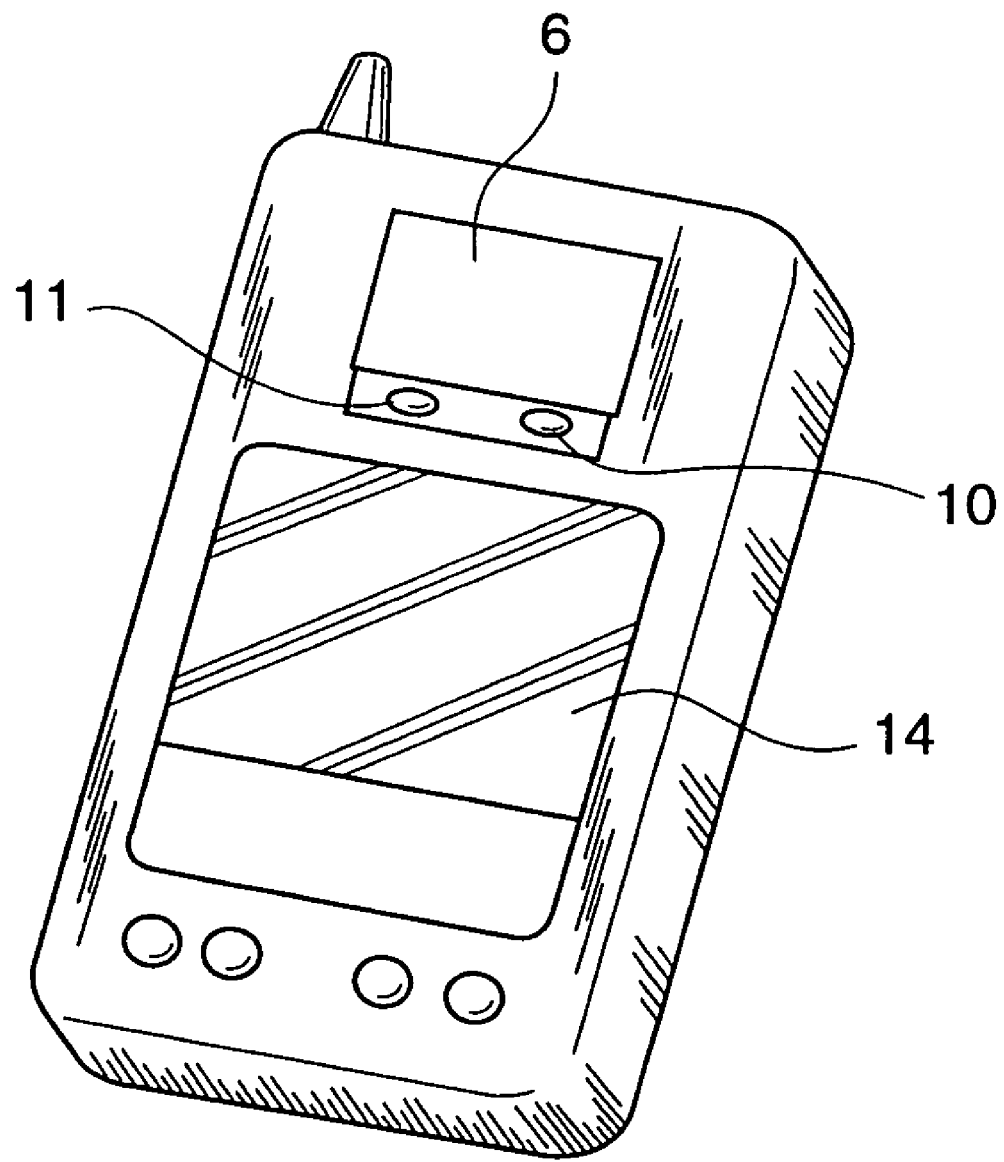
FIG. 3 is a perspective view showing the appearance of the mobile-type electronic apparatus according to the second embodiment.

Referring to FIGS. 2 and 3, the mobile-type electronic apparatus is provided with a light projecting element 10, a CCD sensor 11 and an image processing circuit 11. The light projecting element 10, the CCD sensor 11 and the image processing circuit 12 jointly form a detecting means for detecting whether or not the user has peeped at a prism optical system, which is used as the enlargement display means 6. This detecting means plays the role of the switching means 7 mentioned in the first embodiment described above.

As shown in FIG. 3, which is a perspective view of the mobile-type electronic apparatus, the light projecting element 10 and the CCD sensor 11 are disposed at a peep window part of the enlargement display means 6 so as to detect that the user has peeped at the optical enlargement display means 6, which is composed of a prism or the like.

The light projecting element 10 is an infrared LED. When the user is peeping at the enlargement display means 6, the eyeball of the user is illuminated by the light projecting element 10. As a result, an intrinsic pattern appears on the CCD sensor 11. Then, the image processing circuit 12 makes a check to find whether or not the image of this intrinsic pattern on the CCD sensor 11 is brought forth by the eyeball. If so, the image processing circuit 12 outputs a high (H) level signal. If not, the image processing circuit 12 outputs a low (L) level signal.

A control circuit 13 is arranged to form its output signal at a high level or a low level according to the state of an input terminal group 13a. However, to prevent a power supply for an image display system from turning on or off every time the user winks, the control circuit 13 is provided with a delay circuit which is arranged to make a suitable length of delay of about 100 msec at which no erroneous detection is made in response to any relatively short disturbance such as winking of the user.

This arrangement enables the user to turn on the power supply for the display system only when the user wishes to view images on display. Therefore, the second embodiment not only gives an adequate operability and a good feeling of use but also saves electric energy.

Further, as shown in FIG. 3, the provision of a display element 14 for a display of information on such an operation as making a check for a telephone number or the like further enhances the utility and the electric energy saving effect of the second embodiment.

(Third Embodiment)

In the first and second embodiments described above, the power supply for the display system is controlled according to the state of use of the mobile-type electronic apparatus. It is also possible to arrange a mobile-type electronic apparatus to decide whether or not a high definition display is necessary according to the current state of communication of the apparatus by detecting the communication state, to turn on the power supply if a high definition display is decided to be necessary and, if not, to turn the power supply off.

Figure 4:
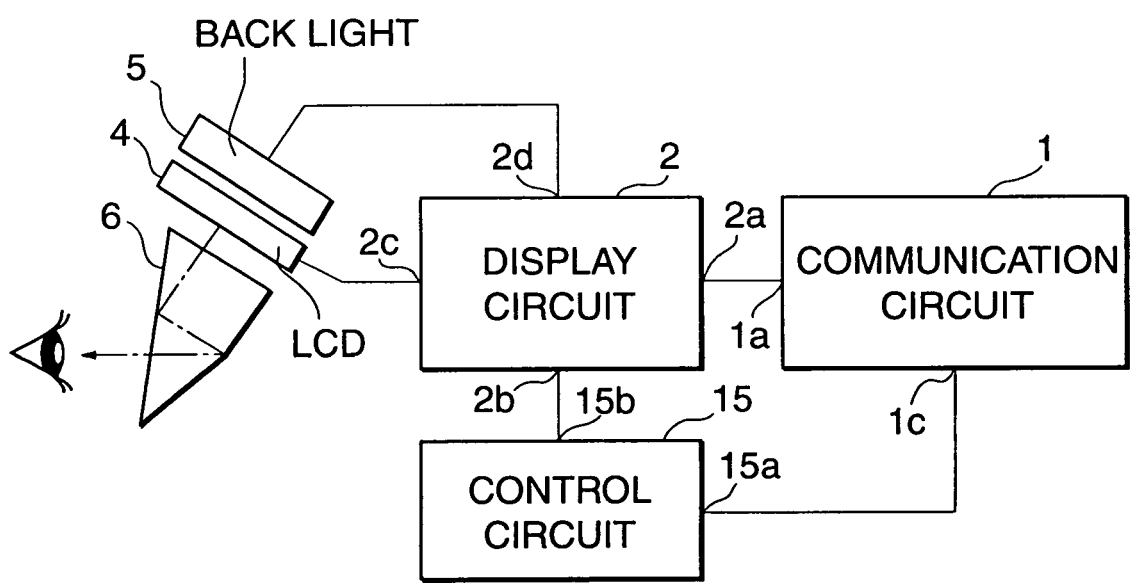
FIG. 4 is a block diagram showing the arrangement of a mobile-type electronic apparatus according to a third embodiment of the invention.

One example of such an arrangement is described below as a third embodiment of the invention with reference to FIG. 4. Referring to FIG. 4, a control circuit 15 has an input terminal group 15a connected to a communication circuit 1 and an output terminal group 15b connected to a display circuit 2. The communication circuit 1 is arranged to output to the control circuit 15 information on the amount of communication data per unit time. If the amount of communication data per unit time is found to be less than a predetermined value and the communication is found to be continuously conducted, a discriminating means, which is included in the control circuit 15, recognizes the communication state as communication by voices only. If the result of a check made by the discriminating means indicates that the communication is conducted by voices only, the control circuit 15 causes the power supply for the display system to turn off for electric energy saving.

Further, the electric energy saving may be attained by discriminating the respective properties of an image signal and an audio signal and turning off the power supply for the display system if it is found that the communication for the audio signal only is conducted.

With a mobile-type electronic apparatus arranged in this manner, the electric energy consumption can be lessened without additionally arranging any special sensor, any special switch or the like. According to the arrangement of the third embodiment, therefore, the mobile-type electronic apparatus can be arranged to be compact in size, to be light in weight and to be usable over a long period of time with its battery charged once.

In each of the first to third embodiments described above, the supply of electric power to the display system is controlled according to the state of use and the state of display of the mobile-type electronic apparatus. Therefore, the electric power to be consumed for displays is lessened to increase a period of time for which the mobile-type electronic apparatus can be rendered usable by charging its battery once.

Further, the arrangement for adaptively controlling the power supply for the image display circuit either in part or in its entirety according to the state of use of the apparatus by the user not only enhances the operability of the apparatus but also effectively minimizes the amount of electric energy consumed for the required operation. Therefore, according to the arrangement of the invention disclosed, a mobile-type electronic apparatus can be arranged to consume a small amount of electric energy.

What is claimed is:

1. A mobile-type electronic apparatus, comprising:
   communication means capable of transmitting and receiving image data;
   a display portion for displaying image data;
   enlargement display means having a prism mounted on the display portion and formed on reflecting or refracting surface thereon to optically enlarge an image displayed on said display portion to display the enlarged image as a virtual image;
   a display circuit arranged to cause said display portion to display image data;
   a plurality of operation buttons means for controlling said display circuit; and
   control means for controlling a power supply for said display circuit in accordance with an operation on said operation buttons;
   wherein said display portion and said operation buttons are provided on a common operation panel of a main body of said mobile-type electronic apparatus and the prism is mounted on the display portion.

2. A mobile-type electronic apparatus, comprising:
   communication means capable of transmitting and receiving image data;
   an operation information display portion arranged to display information necessary for performing a communicating operation;

an image display portion for displaying image data;
enlargement display means having a prism mounted on the display portion and formed on reflecting or refracting surface thereon to optically enlarge an image displayed on said display portion to display the enlarged image as a virtual image;
a display circuit arranged to cause said display portion to display image data;
a plurality of operation buttons provided for controlling said display circuit; and
control means for controlling a power supply for said display circuit in accordance with an operation on said operation buttons;
wherein said operation information display portion image, display portion and said operation buttons are provided on a common operation panel and the prism is mounted on the image display portion.

3. A mobile-type electronic apparatus according to claim 1 or 2, wherein said operation buttons includes a switch which changes an output thereof every time said switch is manually operated.

4. A mobile-type electronic apparatus, comprising:
communication means capable of transmitting and receiving image data;
a display portion for displaying image data;
enlargement display means having a prism mounted on the display portion and formed on reflecting or refracting surface thereon to optically enlarge an image displayed on said display portion to display the enlarged image as a virtual image;
a display circuit arranged to cause said display portion to display image data;
a plurality of operation buttons for controlling said display circuit;
detecting means for detecting that a body of said electronic apparatus has been grasped by hand; and
control means for controlling a power supply for said display circuit in accordance with an operation on said operation buttons;
wherein said display portion and said operation buttons are provided on a common operation panel of a main body of said mobile-type electronic apparatus and the prism is mounted on the display portion.

5. A mobile-type electronic apparatus according to claim 1, further comprising:
a discriminating means for discriminating a communicating state of said communication means.

6. A mobile-type electronic apparatus according to claim 5, wherein said control means turns on the power supply for said display circuit when said discriminating means has detected a state of communicating image data or information to be displayed, and turns off the power supply for a part of or whole of said display circuit when said discriminating means has detected a state of communicating an audio signal only.

7. A mobile-type electronic apparatus according to claim 1, further comprising:
detecting means for detecting that said enlargement display means has been gazed at.

8. A mobile-type electronic apparatus according to claim 7, wherein said control circuit turns on the power supply for said display circuit when said detecting means has detected that said enlargement display means has been gazed at, and turns off the power supply for a part of or whole of said display circuit when said detecting means has detected that said enlargement display means is not gazed at.

* * * * *

UNITED STATES PATENT AND TRADEMARK OFFICE
CERTIFICATE OF CORRECTION

| | | |
|---|---|---|
| PATENT NO. | : 6,970,723 B2 | |
| APPLICATION NO. | : 09/816051 | |
| DATED | : November 29, 2005 | |
| INVENTOR(S) | : Tatsuo Chigira | |

It is certified that error appears in the above-identified patent and that said Letters Patent is hereby corrected as shown below:

Column 8, line 52, delete "buttons means for" and insert --buttons for--

Column 9, line 14, delete "portion image," and insert --portion, image--

Signed and Sealed this

Twenty-second Day of August, 2006

JON W. DUDAS
*Director of the United States Patent and Trademark Office*